L. W. Miller,
Boring Hubs,
No. 7,004.   Patented Jan. 8, 1850.

UNITED STATES PATENT OFFICE.

LEWIS W. MILLER, OF MESOPOTAMIA, OHIO.

CONNECTING CUTTERS TO SHAFTS OF BORING INSTRUMENTS.

Specification of Letters Patent No. 7,004, dated January 8, 1850.

*To all whom it may concern:*

Be it known that I, LEWIS W. MILLER, of Mesopotamia, in the county of Trumbull and State of Ohio, have invented certain new and useful Improvements in Setting Boxes in the Hubs of Carriage-Wheels, and that the following is a full, clear, and exact description of the principle or character which distinguishes them from all other things before known and of the usual manner of making, modifying, and using the same, reference being had to the accompanying drawing, in which—

Figure 2:
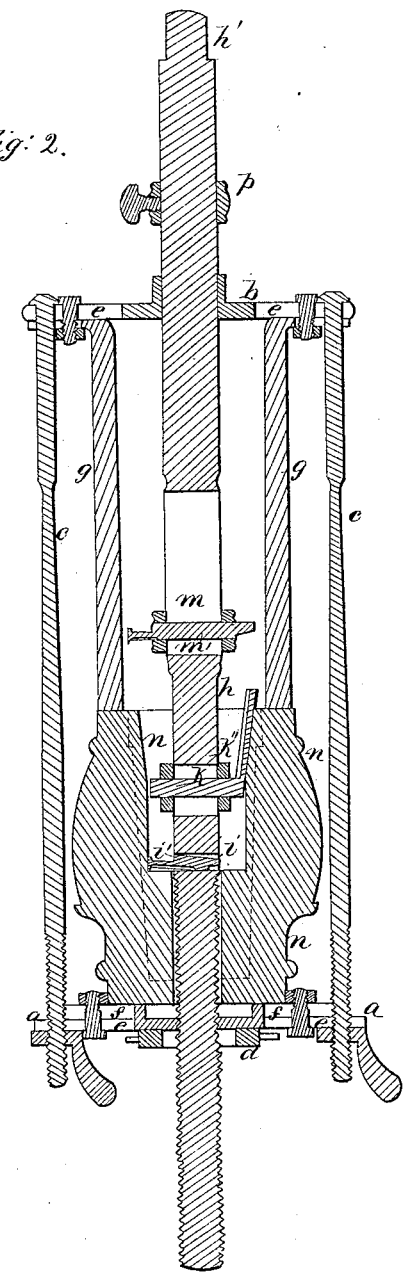
Figure 1:
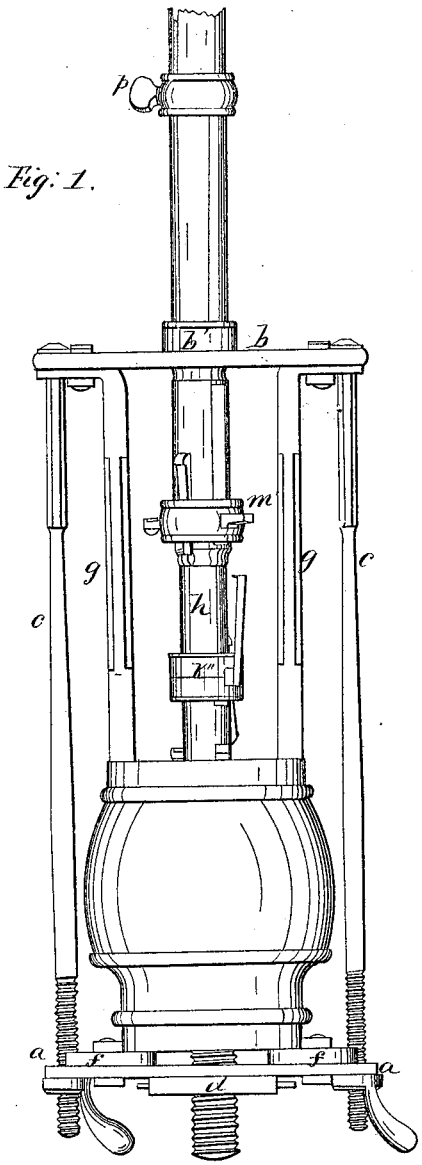

Figure 1, is a plan of the apparatus. Fig. 2, is a section.

The requisites of a machine for setting boxes in hubs is expedition and accuracy of adjustment; these are not found in any machine with which I am acquainted in so great a degree as my improved machine possesses, the details of which I shall hereafter describe. The machine is not new in all its parts; but the improvements are based on the best machine now in use.

The frame is not new, except in certain particulars mentioned in the description; but those parts that facilitate the application of the apparatus to the hub, and the combination of cutters are all new.

The construction is as follows: a metal frame is formed of two end plates ($a$ and $b$) connected by rods ($c$), one at each end of said plate; through the center of the plate ($a$) is a hole, over which there is a divided nut ($d$) into which the mandrel (hereafter described) is screwed into each end of these plates ($a$ and $b$) slits ($e$) are cut, into which the rods ($c$) above named fit; inside of these are adjustable guides to hold the hub steady, and the plates exactly to their center; the guides ($f$) on plate ($a$) are mere nuts, through which and the plate a set screw passes; they fit up against the hub, center it, and hold it steady; on the opposite plate are rods ($g$) long enough to hold the hub in its place against the rests on plate ($a$) by resting with their ends against said hub; these rods are adjusted like the guides ($f$), and when the hub is filled in, as shown in Figs. 1 and 2, it is firmly held by the screws on the connecting rods ($c$) of the frame.

The mandrel ($h$) is a round bar, on one end of which a screw is cut, that screws into the divided nut ($d$) on plate ($a$); after having been put through the axis of the hub, in which a hole is previously bored, for that purpose, the other end of the mandrel is somewhat enlarged for about half its length, and passes through a hole in the center of plate ($b$), which is surrounded by a collar ($b'$), that exactly fits the mandrel, and keeps it steady. There are three oblong mortises in the mandrel, the first of which ($i$) is next to the screw; into this is wedged a cutter, ($i'$) which cuts the size of the smallest part of the hole in the hub; it is a simple cutting edge or gage on the end of a straight bar, and is made and attached like those of ordinary machines; the second mortise ($k$) holds another cutting tool, which is a long knife placed nearly parallel with the axis, but at a sufficient angle to form the taper necessary to fit the box into, as is clearly illustrated in the section, Fig. 2; the shank of this tool passes through the mortise ($k$) perpendicular to its axis; it is further sustained by a collar ($k''$) that surrounds the mandrel through which collar the shank of the tool passes, the collar being tightened by a wedge and thus binding the shank of the tool against the side of the mortise; this mode of fastening is novel, and exceedingly efficacious. This tool is susceptible of a considerable range of adjustment, in consequence of the elongation of the mortise through which its shank passes. The third mortise ($m$) is much longer than the second, and through it passes the shank of a cutting tool ($m'$), similar to the first one named, lettered ($i$) but extending out further than either of the others; this tool is for cutting the recess ($n$) clearly shown by red lines in Fig. 2, and is adjusted and fastened by a collar around the mandrel, in the same way as the cutting tool ($k'$); near the large end of the mandrel, outside the collar on plate ($b$) I fit a set collet or stop ($p$) by which means I can determine the depth to which the cutters shall enter the hub; the extreme end of the mandrel is made square at ($h'$).

To operate this machine, I place it in a perpendicular position, with the square end ($h'$) of the mandrel placed in a socket in the floor; the upper plate ($a$) is then taken off, and the hub placed on with the mandrel through the hole in its axis till the hub is brought down to the first cutter; the plate ($a$) is then replaced and brought down to the hub, and the divided nut closed upon the screw thread of the mandrel and keyed; the rods ($g$) are then placed in their proper position, and by turning the wheel the interior of the hub is properly shaped to receive the boxes.

The divided nuts consists of a female screw, divided through its diameter into two parts, which are wedged together in a frame, in which they move sideways by combining the mandrel with the frame; by this device I greatly reduce the time and labor of applying them to the hub, and by having a set of knives to complete the hub at one operation, I facilitate the work.

I am fully aware that the several details of my improved apparatus are not new, as they may be nearly all found in some other machine; they are not therefore claimed by me in their individual capacity. But What I do claim as new, and for which I desire to secure Letters Patent is The fastening, by which the knives ($k$ and $m$) are affixed to the mandrel, being a keyed ring to sustain the shank of the knives firmly in adjusting slots in the mandrel, substantially as above described.

LEWIS W. MILLER.

Witnesses:
WM. GREENOUGH,
J. J. GREENOUGH.